United States Patent [19]

Sim et al.

[11] 3,911,100

[45] Oct. 7, 1975

[54] SUSTAINED RELEASE OF METHANTHELINE

[75] Inventors: James S. Y. Sim; Maurice H. Van Horn; Arthur I. Cohen; Stanley E. Gordesky; Stanley I. Gordon, all of Rochester, N.Y.

[73] Assignee: Union Corporation, Verona, Pa.

[22] Filed: Sept. 10, 1973

[21] Appl. No.: 395,786

[52] U.S. Cl. .................................. 424/22; 424/81
[51] Int. Cl.² ........................................ A61K 27/12
[58] Field of Search ............................ 424/19–22, 424/81

[56] References Cited
UNITED STATES PATENTS

| | | | |
|---|---|---|---|
| 3,331,798 | 7/1967 | Hibbard | 260/29.6 |
| 3,432,454 | 3/1969 | Hibbard | 260/29.6 |
| 3,551,556 | 12/1970 | Kliment et al. | 424/21 |
| 3,577,512 | 5/1971 | Shepherd et al. | 424/21 |
| 3,689,634 | 9/1972 | Kliment et al. | 424/21 |
| 3,775,537 | 11/1973 | Lehman et al. | 424/21 |

OTHER PUBLICATIONS

Stecher et al., Merck Index 8th Ed. 1968, Merck & Co., Rahway, N.J. p. 671, entry "Methantheline Bromide."

Primary Examiner—Shep K. Rose
Attorney, Agent, or Firm—Pollock, Philpitt & Vande Sande

[57] ABSTRACT

A sustained release pharmaceutical composition which includes methantheline bromide; a polymer of a monomer mixture of a monoester of acrylic acid and-/or methacrylic acid and a polyhydric alcohol; another monoethylenically unsaturated ester; and a diester of acrylic acid and/or methacrylic acid and a polyhydric alcohol; and a polymer of a monomer mixture of a monoester of acrylic and/or methacrylic acid and a polyhydric alcohol; a polymerizable sulfur containing material; and a diester of acrylic and/or methacrylic acid and a polyhydric alcohol.

19 Claims, No Drawings

SUSTAINED RELEASE OF METHANTHELINE

BACKGROUND OF THE INVENTION

The present invention is concerned with a sustained release pharmaceutical composition, and in particular is concerned with a sustained pharmaceutical composition which contains two different water-insoluble but water-swellable hydrophilic polymers of a monoester of acrylic and/or methacrylic acid; another monoethylenically unsaturated ester. The present invention is also concerned with a method for preparing the pharmaceutical compositions.

It has previously been suggested to incorporate drugs into hydrophilic polymers to provide sustained release of the drug. Although a wide variety of suitable polymers and applicable drugs have previously been suggested, only a very limited number of conbinations of particular drugs and particular polymers have to date been successful in providing sustained release characteristics.

In addition, the majority of the prior art combinations exhibit a release profile which follows first order kinetics and a high initial release rate which decays rapidly as the concentration of the drug in the polymer decreases.

Moreover, various prior suggested combinations have release rates which are too fast for providing sufficiently long release times to be of any practical significance.

It has become quite evident that not any combination of any drug and any hydrophilic polymer will provide a sustained release pharmaceutical composition. The preparation of sustained release pharmaceutical compositions from polymers and drugs is highly empirical. The art has not advanced to the stage where a person skilled in the art can predict whether a particular combination of a drug and hydrophilic polymer will produce a sustained release pharmaceutical composition.

Accordingly, it is an object of the present invention to provide a suitable sustained release pharmaceutical composition. It is a further object of the present invention to provide a sustained release pharmaceutical composition which releases the drug over a relatively long period of time.

A further object of the present invention is to make it possible to obtain release of a drug which at least approaches zero order (i.e., a substantially constant amount of release of the drug per unit time) for some portion of the time during the treatment period.

SUMMARY OF THE INVENTION

The present invention is concerned with a sustained release multibarrier pharmaceutical composition comprising:

A. An outer matrix of a water-insoluble but water-swellable hydrophilic polymer of a monomer mixture containing:
   1. polymerizable monoester of acrylic and/or methacrylic acid and a polyhydric alcohol;
   2. monoethylenically unsaturated ester selected from the group consisting of alkyl acrylates, alkyl methacrylates, vinyl esters of saturated monocarboxylic acids of up to 22 carbon atoms, and mixtures thereof, wherein the alkyl group of said methacrylate or acrylate contains from 1 to 22 carbon atoms; and
   3. polymerizable diester of acrylic and/or methacrylic acid and a polyhydric alcohol; and
   wherein the monomer mixture contains from about 24 to about 65% by weight of (1); from about 34 to about 75% by weight of (2); and from about 0.1 to about 10% by weight of (3) based upon the total weight of (1), (2), and (3) in the monomer mixture;

B. An inner matrix within said outer matrix and being a water-insoluble but water-swellable hydrophilic polymer of a monomer mixture containing:
   1. polymerizable monoester of acrylic and/or methacrylic acid and a polyhydric alcohol;
   2. a polymerizable sulfur containing material selected from the group consisting of polymerizable ethylenically unsaturated organic sulfonic acids, ammonium salts thereof; alkali metal salts thereof; and mixtures thereof; and
   3. polymerizable diester of acrylic and/or methacrylic acid and a polyhydric alcohol; and
   wherein the monomer mixture contains from about 25 to about 90% by weight of (1); from about 5 to about 45% by weight of (2); and from about 5 to about 40% by weight of (3) based upon the total weight of (1), (2) and (3) in the monomer mixture; and C. Methantheline bromide in an amount at least sufficient for the total dosage requirement during a treatment period; and being entrapped in said inner matrix.

The present invention is also concerned with a method for preparing the sustained release pharmaceutical composition which comprises:

A. entrapping the methantheline bromide in an inner matrix in an amount at least sufficient for the total dosage requirement during a treatment period;

B. the inner matrix being a water-insoluble but water-swellable hydrophilic polymer of a monomer mixture containing
   1. polymerizable monoester of acrylic and/or methacrylic acid and a polyhydric alcohol;
   2. a polymerizable sulfur containing material selected from the group consisting of polymerizable ethylenically unsaturated organic sulfonic acids; ammonium salts thereof; alkali metal salts thereof; and mixtures thereof; and
   3. polymerizable diester of acrylic and/or methacrylic acid and a polyhydric alcohol; and wherein the monomer mixture contains from about 25% to about 90% by weight of (1); from about 5 to about 45% by weight of (2); and from about 5 to about 40% of weight of (3) based upon the total weight of (1), (2) and (3) in the monomer mixture;

C. grinding the resulting composition of the methantheline bromide and inner matrix into a powder;

D. admixing the powder and the monomeric mixture containing the polymerizable monoester; other unsaturated ester and diester; and E. then polymerizing to provide an outer matrix of the water-insoluble but water-swellable hydrophilic polymer of the monomer mixture containing the polymerizable monoester; other unsaturated ester and diester.

DESCRIPTION OF PREFERRED EMBODIMENTS

The polymerizable monoesters which are suitable in obtaining the polymers of the outer matrix employed in the present invention must be water-miscible. Such polymerizable monoesters are monoesters of either acrylic and/or methacrylic acid and a polyhydric alcohol and preferably a dihydric alcohol. Suitable dihydric alcohols which may be employed to form the esters used in the present invention include among others ethylene glycol, 1,3-propanediol, the dialkylene glycols such as diethylene glycol and dipropylene glycol; and the polyalkylene glycols such as polyethlene glycol; and 1,4-butanediol. Some suitable polyhydric alcohols which contain from 3 to 6 alcohol groups and which may be employed to form the ester used in the present invention include glycerol, trimethylol propane, trimethylolethane, pentaerylthritol, and hexitols such as mannitol and sorbitol. Examples of some suitable polymerizable monoesters include 2-hydroxy ethyl methacrylate, 2-hydroxy ethyl acrylate, 2-hydroxy propyl methacrylate, diethylene glycol monomethacrylate, diethylene glycol monoacrylate, 2-hydroxy propyl acrylate, 3-hydroxy propyl methacrylate, 3-hydroxy propyl acrylate, dipropylene glycol monomethacrylate, glyceryl methacrylate, and pentaerythritol methacrylate, with the preferred polymerizable monoester being 2-hydroxy ethyl methacrylate. The amount of polymerizable monoester employed in the monomeric mixture to prepare the polymers of the outer matrix is usually from about 24 to about 65% by weight, and is preferably from about 29 to about 55% by weight, based upon the total weight of the polymerizable monoester, the other unsaturated ester, and the diester. The most preferred amount of monoester is between about 33 and about 49.5% by weight based upon the total weight of the monoester, other unsaturated ester, and diester.

The other monoethylenically unsaturated ester which may be employed in preparing the polymers employed in the outer matrix include the alkyl methacrylates, the alkyl acrylates, the vinyl esters of saturated monocarboxylic acids, and mixtures thereof.

Usually the alkyl radical of the methacrylate or acrylate contains up to 22 carbon atoms, and preferably contains from 1 to 5 carbon atoms. Some examples of methacrylates suitable for use in the present invention include methyl methacrylate, ethyl methacrylate, isopropyl methacrylate, butyl methacrylate, capryl methacrylate, palmityl methacrylate, stearyl methacrylate, and lauryl methacrylate. Some suitable acrylate esters include ethyl acrylate, methyl acrylate, isopropyl acrylate, butyl acrylate, and lauryl acrylate.

The vinyl esters suitable in the present invention include the vinyl esters of monocarboxylic acids wherein the acid contains up to about 22 carbon atoms. Some suitable vinyl esters include vinyl acetate, vinyl propionate, vinyl butyrate, vinyl stearate, and the vinyl ester of "Versatic" 911 acid which is a saturated synthetic tertiary monocarbosylic acid having $C_9$, $C_{10}$, and $C_{11}$ chain length. The most preferred vinyl ester is vinyl acetate.

The preferred unsaturated esters employed in the outer matrix are the methacrylates of which the most preferred is methyl methacrylate. The amount of unsaturated ester employed is usually between about 34 and about 75% by weight, and preferably between about 40 and about 70% by weight based upon the total weight of the monoester, other unsaturated ester, and diester. The most preferred quantity of ester is between about 49.5% and about 65% by weight based upon the total weight of the monoester, other unsaturated ester, and diester.

The polymerizable diesters employed in the outer matrix are diesters of acrylic and/or methacrylic acid and a polyhydric alcohol and preferably a dihydric alcohol. Illustrative of such diesters are ethylene glycol diacrylate, ethylene glycol dimethylacrylate, 1,2-butylene dimethacrylate, 1,3-butylene dimethacrylate, 1,4-butylene dimethacrylate, propylene glycol diacrylate, propylene glycol dimethacrylate, diethylene glycol dimethacrylate, dipropylene glycol dimethacrylate, diethylene glycol diacrylate, dipropylene glycol diacrylate, tetraethylene glycol dimethacrylate, and tetraethylene glycol diacrylate. The preferred diester is ethylene glycol dimethacrylate. The amount of diester employed is usually between about 0.1 and about 10%, preferably between about 0.5 and 2%, and most preferably about 1% by weight based upon the total weight of the monoester, other unsaturated ester, and diester.

The polymer of the outer matrix is usually present in amounts of about 40 to about 90% by weight, preferably from about 50 to about 80% by weight, and most preferably from about 65 to about 75% by weight based upon the total weight of the water insoluble but water swellable polymer of the outer matrix, the water insoluble but water swellable polymer of the inner matrix and the methantheline bromide.

The polymerizable monoesters which are suitable in obtaining the polymers of the inner matrix are the same type of monoesters described hereinabove for the polymers of the outer matrix.

The preferred polymerizable monoester for the polymers of the inner matrix is 2-hydroxyethyl methacrylate. The amount of polymerizable monoester employed in the polymers of the inner matrix is usually between about 25 and about 90% by weight, and is preferably between about 30 and about 56% by weight based upon the total weight of the monoester, sulfur containing compound, and diester in the monomer mixture. The most preferred quantity of ester is about 45% by weight based upon the total weight of the monoester, sulfur containing material, and diester in the monomer mixture.

The polymerizable sulfur containing material employed in the polymers of the inner matrix include polymerizable ethylenically unsaturated organic sulfonic acids and/or ammonium salts thereof and/or alkali metal salts thereof such as sodium and potassium salts thereof. Illustrative of some polymerizable ethylenically unsaturated organic sulfonic acids include vinylsulfonic acid, vinylpropanesulfonic acid and styrene sulfonic acids such as p-vinylbenzene-sulfonic acid. The preferred acid is p-vinylbenzenesulfonic acid and the preferred polymerizable sulfur containing material is sodium p-vinylbenzenesulfonate.

The amount of polymerizable sulfur containing material is usually between about 5 and about 45% by weight, and is preferably between about 22 and 40% by weight, and is most preferably about 30% by weight based upon the total weight of the monoester, sulfur containing material and diester in the monomer mixture.

The polymerizable diesters which are suitable in obtaining the polymers of the inner matrix are the same type of diesters described hereinabove for the polymers of the outer matrix. The preferred polymerizable diester for the polymers of the inner matrix is tetraethylene glycol dimethacrylate. The amount of polymerizable diester employed in the polymers of the inner matrix is usually between about 5 and about 40% by weight, and is preferably between about 22 and about 30% by weight, and is most preferably about 25% by weight based upon the total weight of the monoester, sulfur containing material and diester.

The monomer mixture for obtaining the polymers suitable for use as the outer matrix contains from about 24 or from about 29 to about 49.3% by weight of the polymerizable ethylenically unsaturated monoester, from about 34 or from about 40 to about 64.6% by weight of the monoethylenically unsaturated ester; and from about 0.1 or from about 0.5 to about 1% by weight of the polymerizable diester based upon the total weight of the polymerizable monoester, the monoethylenically unsaturated ester, and the polymerizable diester in the monomer mixture for polymers of the outer matrix.

The monomer mixture for obtaining the polymers suitable for use as the inner matrix contains from about 25 or from about 30% to about 44.3% by weight of the polymerizable monoester; from about 5 or about 22 to about 30% by weight of the polymerizable sulfur-containing material; and from about 5 or about 22 to about 25.2% by weight of the polymerizable diester based upon the total weight of the polymerizable monoester, polymerizable sulfur-containing material and polymerizable diester in the monomer mixture for polymers of the inner matrix.

The inner matrix is generally present in amounts of about 1 to 50% by weight, preferably about 5 to about 35% by weight and most preferably from about 10 to about 25% by weight based upon the total weight of the water insoluble but water swellable polymer of the outer matrix, the water insoluble but water swellable polymer of the inner matrix and the methantheline bromide.

The methantheline bromide is generally used in amounts of about 0.1 to about 50%, preferably from about 0.5 to about 20% and most preferably from about 8 to about 15% by weight based upon the total weight of the methantheline bromide, water-insoluble but water-swellable hydrophilic polymer of the outer matrix and the water-insoluble but water-swellable hydrophilic polymer of the inner matrix.

In addition, the pharmaceutical compositions of the present invention can include such other materials as plasticizers, inert fillers, and suspending aids such as Cab-O-Sil, and bentone for the methantheline bromide.

Moreover, the compositions of the present invention can be further encapsulated by another polymeric or other film-forming substance according to particular applications of the composition. Such auxiliary encapsulating layers can be soluble or insoluble in aqueous medium, the solubility or swelling being dependent or independent or pH and/or ionic strength, and can be susceptible or nonsusceptible to enzymatic action.

The pharmaceutical compositions of the present invention can be prepared by first contacting the methantheline bromide with the water-insoluble but water-swellable polymer of the inner matrix such as by immersing the polymer in a bath such as an aqueous bath of the drug to cause diffusion of the methantheline bromide into a polymer matrix. Generally the methantheline bromide is contacted with the polymer of the inner matrix for at least about 15 minutes to cause diffusion into the polymer matrix. Of course, this can vary greatly depending upon the relative amounts of the drug and inner matrix.

Also methantheline bromide can be entrapped in the inner matrix by admixing the methantheline bromide or an aqueous solution thereof and the monomeric mixture containing the polymerizable monoester, unsaturated sulfur containing compound, and diester; and then by polymerizing to provide a matrix of the water-insoluble but water-swellable polymer entrapping methantheline bromide.

The resulting composition is then preferably ground into a fine powder to facilitate subsequent admixing with the monomeric composition containing the polymerizable monoester, other unsaturated ester and diester for the polymer of the outer matrix to provide a homogeneous composition. If the composition of the inner matrix and methantheline bromide contains liquid materials such as water, it is desirable to remove the liquid by air evaporation or heat before the composition is ground into a fine powder. After the composition is ground into a fine powder, it is preferably admixed with monomeric composition containing the polymerizable monoester, other unsaturated ester and diester. Then the composition is polymerized to provide an outer matrix of the water-insoluble but water-swellable hydrophilic polymer of the monomer mixture containing the polymerizable monoester; other unsaturated ester and diester; an inner matrix within the outer matrix and being a water-insoluble but water-swellable hydrophilic polymer of the monomer mixture containing the polymerizable monoester, sulfur containing compound, and diester; and methantheline bromide entrapped in said inner matrix. In addition the compositions of the present invention can be prepared by encapsulating or coating the fine powder or the inner matrix and methantheline bromide with an already formed polymer of the monoester, other unsaturated ester and diester.

The water-swellable polymers employed both in the inner matrix and outer matrix generally can be prepared by employing bulk polymerization techniques. The term "bulk polymerization" as used herein includes those polymerizations carried out in the absence of a solvent or dispersing liquid as well as those polymerizations carried out in the presence of water or water-soluble or polymer-soluble liquid swelling agents in such amounts as not to significantly alter the nature of the polymerization process.

The polymerization catalyst employed can be any of the catalysts which are suitable in polymerizing compounds containing ethylenic unsaturation and preferably are the free radical catalysts. Of particular interest are the peroxide catalysts. Some examples of suitable peroxide catalysts include hydrogen peroxide, benzoyl peroxide, tertbutyl peroctoate, phthalic peroxide, succinic peroxide, benzoyl acetic peroxide, tert-butyl peroxy pivalate, coconut oil acid peroxide, lauric peroxide, stearic peroxide, oleic peroxide, tert-butyl hydroperoxide, tetraline hydroperoxide, tert-butyl diperphthalate, cumene hydroperoxide, tert-butyl perbenzoate, acetyl peroxide, 2,4-dichlorobenzoyl peroxide, urea peroxide, caprylyl peroxide, p-chlorobenzoyl peroxide, ditert-butyl peroxide, 2,2-bis(tert-butyl peroxy)-butane, hydroxyheptyl peroxide, the diperoxide of benzaldehyde; alkylperoxycarbonates such as diisobutylperoxy bicarbonate, di-secondary butyl peroxy bicarbonate, and tert-butyl peroxyisopropylcarbonate, and the like. The preferred catalyst is one which is effective at moderately low temperatures such as at about 30°–90° C.

The amount of catalyst employed depends upon the type of catalyst system used and is generally from about 0.01 to about 10 parts by weight per 100 parts of the monomer mixture, and preferably is from about 0.1 to about 1 part by weight per 100 parts of the monomer mixture.

The polymerization is generally carried out at temperatures from about room temperature to about 150° C. It is generally preferred to initiate the polymerization at relatively low temperatures such as from about 35° to about 85° C and then to increase the temperature to about 90° to about 150° C as the reaction proceeds and preferably after most of the reaction has been completed. The most preferred initial temperature range of polymerization is between about 30° and 90° C.

Usually the polymerization is conducted under autogenous pressure in a closed reaction vessel. However, any suitable means to prevent significant evaporation of any of the monomers can be employed.

Generally, the polymerization is completed in about 1/2 to about 12 hours and preferably is completed in about 4 to about 6 hours. It is understood, of course, that the time and temperature are inversely related. That is, temperatures employed at the upper end of the temperature range will provide polymerization processes which can be completed near the lower end of the time range.

In addition, it may be desirable for the copolymers obtained from such polymerizations to be post cured at temperatures somewhat higher than those initially employed in the polymerization. Usually the temperatures employed in the post cure will range from about 90° to about 150° C. Two hours is usually more than sufficient for such a post curing operation. Preferably the post cure is completed in 2 to 4 hours.

The pharmaceutical compositions of the present invention can be utilized for oral ingestion, implantation, or external application to a mucous membrane. The pharmaceutical compositions of the present invention can be implanted subcutaneously, constitute a part of a prosthesis, or be inserted in a cavity of the human body. Upon application to the desired part of the body by the desired mode, the pharmaceutical compositions of the present invention provide sustained release of the pharmacological material by diffusion through pores of the water-insoluble but water-swellable polymeric matrices to the desired part of the body upon contact with body fluids.

The present invention makes it possible to obtain a sustained release pharmaceutical composition which provides sustained release of the methantheline bromide over a relatively long period of time.

In addition, the present invention makes it possible to obtain a sustained release of the methantheline bromide which approaches zero order release during portions of the treatment period, and therefore, can be considered to be pseudo zero order or substantially zero order release. In addition, the sustained release characteristics of the present invention could not be predicted particularly since the polymers employed in this invention did not always provide sustained release compositions. Moreover when methantheline bromide is employed together with other polymers, a sustained release composition is not always obtained.

The following examples are presented to further illustrate the present invention. All parts are by weight unless the contrary is stated.

EXAMPLE 1

A polymeric composition is prepared by admixing about 20 parts of water, and about 100 parts of a polymerizable composition containing about 44.3% by weight of 2-hydroxyethylmethacrylate, about 30% by weight of sodium p-vinylbenzenesulfonate, about 25.2% of tetraethylene glycol dimethacrylate, and about 0.5% of tert-butyl perocotate. The mixture is heated to 50° C for about 12 hours under a nitrogen atmosphere of 20 psi to effect polymerization. The mixture is post-cured by heating under atmospheric pressure at 80° C for 2 hours.

The resulting polymeric composition is soaked for about 12 hours at ambient temperature in 5000 parts of isotonic saline solution (0.9% NaCl) containing 100 mg of methantheline bromide per 5 ml of saline solution. The composition is then dried by heating under atmospheric pressure at 90° C for about 3 hours. The dried composition is ground into a fine powder by a mortar and pestle. 29.7 parts of the composition which contains about 18.4 parts of the polymer matrix and about 11.3 parts of the methantheline bromide are admixed with about 70.3 parts of a polymerizable composition containing about 49.3% by weight of 2-hydroxymethylmethacrylate; about 49.3% by weight of methylmethacrylate, about 1% by weight of ethylene glycol dimethacrylate and about 0.4% by weight of tert butyl perocotate. The mixture is heated to 75° C for about 2 hours under a nitrogen atmosphere of 10 psi to effect polymerization. The mixture is post-cured by heating under atmospheric pressure at 100° C for 2 hours.

The above composition is introduced into a beaker containing 20 milliliters of isotonic saline solution (0.9% NaCl) and the beaker is shaken at a constant temperature of 37° C in a thermostatic water bath shaker. The concentration of eluted methantheline is determined with a Beckman DB-GT spectrophotometer using the maximum absorption of methantheline bromide at 282 nanometers. Elution rates are checked at the time intervals shown below and fresh isotonic saline is employed after each reading. The results are listed below.

| Time (Hours) | mg of Methantheline Eluted per 100 mg of polymer | Time (Hours) | mg of Methantheline Eluted per 100 mg of polymer |
|---|---|---|---|
| 24 | 2.629 | 384 | .057 |
| 48 | .458 | 408 | .057 |
| 72 | .268 | 456 | .102 |
| 96 | .154 | 480 | .063 |
| 120 | .143 | 504 | .038 |
| 144 | .124 | 528 | .053 |
| 168 | .106 | 552 | .043 |
| 192 | .092 | 648 | .057 |
| 216 | .086 | 672 | .053 |
| 240 | .086 | 696 | .048 |
| 264 | .086 | 720 | .048 |
| 288 | .086 | 744 | .038 |
| 312 | .091 | 792 | .043 |
| 336 | .082 | 816 | .048 |
| 360 | .063 | 840 | .043 |
|  |  | 864 | .038 |

EXAMPLE 2

Example 1 is repeated except that the composition is obtained from about 20.4 parts of the polymer of the inner matrix, about 12.5 parts of methantheline bromide, and about 67.1 parts of the polymer of the outer matrix, and the outer matrix is a polymer obtained from a polymerizable mixture of about 33% by weight of 2-hydroxyethylmethacrylate; about 64.6% by weight of methyl metnacrylate, about 1% by weight of ethylene glycol dimethacrylate, and about 0.4% by weight of tert butyl peroctoate. The results are listed below.

| Time (Hours) | mg of Methantheline Eluted per 100 mg of Polymer | Time (Hours) | mg of Methantheline Eluted per 100 mg of Polymer |
|---|---|---|---|
| 24 | 2.405 | 384 | .080 |
| 48 | .659 | 408 | .081 |
| 72 | .432 | 456 | .158 |
| 96 | .259 | 480 | .091 |
| 120 | .241 | 504 | .056 |
| 144 | .198 | 528 | .061 |
| 168 | .173 | 552 | .066 |
| 192 | .163 | 648 | .086 |
| 216 | .137 | 672 | .076 |
| 240 | .172 | 696 | .071 |
| 264 | .137 | 720 | .071 |
| 288 | .117 | 744 | .061 |
| 312 | .127 | 792 | .061 |
| 336 | .112 | 816 | .061 |
| 360 | .096 | 840 | .066 |
|  |  | 864 | .046 |

What is claimed is:

1. A sustained release 846 hour after administration methantheline eluting multibarrier pharmaceutical composition comprising:
A. a polymerized and cured outer matrix of a water-insoluble but water-swellable hydrophilic polymer of a monomer mixture containing:
 1. polymerizable monoester of a member selected from the group consisting of acyrlic acid, methacrylic acid, and mixtures thereof; and a polyhydric alcohol;
 2. monoethylenically unsaturated ester selected from the group consisting of alkyl acrylates, alkyl methacrylates, vinyl esters of saturated monocarboxylic acids of up to 22 carbon atoms, and mixtures thereof, wherein the alkyl group of said methacrylate or acrylate contains from 1 to 22 carbon atoms; and
 3. polymerizable diester of a member selected from the group consisting of acrylic acid, methacrylic acid, and mixtures thereof; and polyhydric alcohol; and
wherein the monomer mixture contains from about 24 to about 49.3% by weight (A) (1); from about 34 to about 64.6% by weight of (A) (2); and from about 0.1 to about 1% by weight of (A) (3) based upon the total weight of (A) (1), (A) (2), and (A) (3) in the monomer mixture;
B. a polymerized and cured inner matrix within said outer matrix and being a water-insoluble but water-swellable hydrophilic polymer of a monomer mixture containing:
 1. polymerizable monoester of a member selected from the group consisting of acrylic acid, methacrylic acid, and mixtures thereof; and a polyhydric alcohol;
 2. a polymerizable sulfur-containing material selected from the group consisting of vinyl sulfonic acid, vinylpropane sulfonic acid, and styrene sulfonic acids, ammonium salts thereof; alkali metal salts thereof; and mixtures thereof; and
 3. polymerizable diester of a member selected from the group consisting of acrylic acid, methacrylic acid, and mixtures thereof; and a polyhydric alcohol; and
wherein the monomer mixture contains from about 25 to about 44.3% by weight of (B) (1); from about 5 to about 30% by weight of (B) (2); and from about 5 to about 25.2% by weight of (B) (3) based upon the total weight of (B) (1), (B) (2), and (B) (3) in the monomer mixture; and
C. said polymerized and cured inner matrix having been soaked for about 12 hours in isotonic saline solution containing per 5 ml of isotonic saline solution at least about 100 mg of methantheline bromide in an amount at least sufficient for the total dosage requirement adapted to gradually elute, upon administration during 864 hours of a treatment period; and thereby entrapping the methantheline bromide in said inner matrix.

2. The composition of claim 1 wherein each of said polymerizable monoesters (A) (1) and (B) (1) is selected from the group consisting of 2-hydroxy ethyl methacrylate, 2-hydroxy ethyl acrylate, 2-hydroxy propyl methacrylate, diethylene glycol monomethacrylate, diethylene glycol monoacrylate, 2-hydroxy propyl acrylate, 3-hydroxy propyl methacrylate, 3-hydroxy propyl acrylate, dipropylene glycol monomethacrylate, glyceryl methacrylate, and pentaerythritol methacrylate.

3. The composition of claim 1, wherein each of said monoesters (A) (1) and (B) (1 ) is 2-hydroxy ethyl methacrylate.

4. The composition of claim 1 wherein said monoethylenically unsaturated ester (A) (2) is selected from the group consisting of methyl methacrylate, ethyl methacrylate, isopropyl methacrylate, butyl methacrylate, capryl methacrylate, palmityl methacrylate, stearyl methacrylate, lauryl methacrylate, ethyl acrylate, methyl acrylate, isopropyl acrylate, butyl acrylate, lauryl acrylate, vinyl acetate, vinyl propionate, vinyl butyrate, vinyl stearate, and the vinyl ester of a saturated tertiary monocarboxylic acid having $C_9$, $C_{10}$, and $C_{11}$ chain length.

5. The composition of claim 1 wherein said monoethylenically unsaturated ester (A) (2) is methylmethacrylate.

6. The composition of claim 1 wherein each of said diesters (A) (3) and (B) (3) is selected from the group consisting of ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylene glycol dimethacrylate, dipropylene glycol dimethacrylate, diethylene glycol diacrylate, dipropylene glycol diacrylate, tetraethylene glycol dimethacrylate, and tetraethylene glycol diacrylate.

7. The composition of claim 1 wherein said diester (A) (3) is ethylene glycol dimethacrylate and said diester (B) (3) is tetraethylene glycol dimethacrylate.

8. The composition of claim 1 wherein said polymerizable sulfur-containing material is selected from the group consisting of styrene sulfonic acids, ammonium salts thereof, alkali metal salts thereof, and mixtures thereof.

9. The composition of claim 1 wherein said polymerizable sulfur-containing material is sodium p-vinylbenzene sulfonic acid.

10. The composition of claim 1 wherein the monomer mixture of the outer matrix contains from about 29 to about 49.3% by weight of (A) (1); from about 40 to about 64.6% by weight of (A) (2); and from about 0.5 to about 1% by weight of (A) (3) based upon the total weight of (A) (1), (A) (2), and (A) (3) in said monomer mixture; and wherein the monomer mixture of the inner matrix contains from about 30 to about 44.3% by weight of (B) (1); from about 22 to about 30% by weight of (B) (2); and from about 22 to about 25.2% by weight of (B) (3) based upon the total weight of (B) (1), (B) (2), and (B) (3) in the monomer mixture of the inner matrix.

11. The composition of claim 1 wherein each of said polymerizable monoesters (A) (1) and (B) (1) is a monoester of a member selected from the group consisting of acrylic acid, methacrylic acid, and mixtures thereof, and a polyhydric alcohol selected from the group consisting of ethylene glycol, 1,3-propanediol, diethylene glycol, dipropylene glycol, polyethylene glycol, polypropylene glycol, 1,6-hexamethylene glycol, 1,4-butanediol, glycerol, trimethylol propane, trimethylolethane, pentaerythritol, mannitol, and sorbitol.

12. The composition fo claim 1 wherein each of said polymerizable monoesters (A) (1) and (B) (1) is a monoester of a member selected from the group consisting of acrylic acid, methacrylic acid, and mixtures thereof; and a polyhydric alcohol selected from the group consisting of ethylene glycol, 1,3-propanediol, diethylene glycol, dipropylene glycol, polyethylene glycol, polypropylene glycol, 1,6-hexamethylene glycol, 1,4-butanediol, glycerol, trimethylol propane, trimethylolethane, pentaerythritol, mannitol, and sorbitol; wherein said polymerizable sulfur-containing material (B) (2) is selected from the group consisting of styrene sulfonic acids, ammonium salts thereof, alkali metal salts thereof, and mixtures thereof; and wherein each of said diesters (A) (3) and (B) (3) is selected from the group consisting of ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylene glycol dimethacrylate, dipropylene glycol dimethacrylate, diethylene glycol diacrylate, dipropylene glycol diacrylate, tetraethylene glycol dimethacrylate, and tetraethylene glycol diacrylate, and where said monoethylenically unsaturated ester (A) (2) is selected from the group consisting of methyl methacrylate, ethyl methacrylate, isopropyl methacrylate, butyl methacrylate, capryl methacrylate, palmityl methacrylate, stearyl methacrylate, lauryl methacrylate, ethyl acrylate, methyl acrylate, isopropyl acrylate, butyl acrylate, lauryl acrylate, vinyl acetate, vinyl propionate, vinyl butyrate, vinyl stearate, and the vinyl ester of a saturated synthetic tertiary monocarboxylic acid having $C_9$, $C_{10}$, and $C_{11}$ chain length.

13. The composition of claim 12 wherein each of said polymerizable monoesters (A) (1) and (B) (1) is selected from the group consisting of 2-hydroxy ethyl methacrylate, 2-hydroxy ethyl acrylate, 2-hydroxy propyl methacrylate, diethylene glycol monomethacrylate, diethylene glycol monoacrylate, 2-hydroxy propyl acrylate, 3-hydroxy propyl methacrylate, 3-hydroxy propyl acrylate, dipropylene glycol monomethacrylate, glyceryl methacrylate, and pentaerythritol methacrylate.

14. The composition of claim 13 wherein the monomer mixture of the outer matrix contains from about 29 to about 35% by weight of (A) (1); from about 40 to about 64.6% by weight of (A) (2); and from about 0.5 to about 1% by weight of (A) (3) based upon the total weight of (A) (1), (A) (2), and (A) (3) in said monomer mixture; and wherein the monomer mixture of the inner matrix contains from about 30 to about 44.3% by weight of (B) (1); from about 22 to about 30% by weight of (B) (2); and from about 22 to about 25.2% by weight of (B) (3) based upon the total weight of (B) (1), (B) (2), and (B) (3) in the monomer mixture of the inner matrix.

15. The composition of claim 1 wherein each of said monoesters (A) (1) and (B) (1) is 2-hydroxy ethyl methacrylate, said sulfur-containing monomer (B) (2) is sodium p-toluene sulfonic acid; said diester (A) (2) is ethylene glycol dimethacrylate; said diester (B) (3) is tetraethylene glycol dimethacrylate, and said monoethylenically unsaturated ester (A) (2) is methyl methacrylate.

16. The composition of claim 15 wherein the monomer mixture of the outer matrix contains from about 29 to about 49.3% by weight of (A) (1); from about 40 to about 64.6% by weight of (A) (2); and from about 0.5 to about 1% by weight of (A) (3) based upon the total weight of (A) (1), (A) (2), and (A) (3) in said monomer mixture; and wherein the monomer mixture of the inner matrix contains from about 30 to about 44.3% by weight of (B) (1); from about 22 to about 30% by weight of (B) (2); and from about 22 to about 25.2% by weight of (B) (3) based upon the total weight of (B) (1), (B) (2), and (B) (3) in the monomer mixture of the inner matrix.

17. The composition of claim 1 wherein the outer matrix is present in an amount from about 50 to about 80% by weight and said inner matrix is present in an amount from about 5 to about 35% by weight based upon the total weight of said outer matrix, said inner matrix, and said methantheline bromide in the composition.

18. The composition of claim 1 wherein the outer matrix is present in an amount from about 65 to about 75% by weight and said inner matrix is present in an amount from about 10 to about 25% by weight of said outer matrix, said inner matrix, and said methantheline bromide in the composition.

19. The method for preparing the sustained release pharmaceutical composition of claim 1 which comprises:

A. entrapping the methantheline bromide in an inner matrix in an amount at least sufficient for the total dosage requirement during a treatment period;

B. the inner matrix being a water-insoluble but water-swellable hydrophilic polymer of a monomer mixture containing:
  1. polymerizable monoester of a member selected from the group consisting of acrylic acid, methacrylic acid, and mixtures thereof; and a polyhydric alcohol;
  2. a polymerizable sulfur-containing material selected from the group consisting of vinyl sulfonic acid, vinylpropane sulfonic acid, and styrene, sulfonic acids, ammonium salts thereof, alkali metal salts thereof; and mixtures thereof; and 3. polymerizable diester of a member selected from the group consisting of acrylic acid, methacrylic acid, and mixtures thereof; and a polyhydric alcohol; and wherein the monomer mixture contains from about 25 to about 44.3% by weight of (B) (1); from about 5 to about 30% by weight of (B) (2); and from about 5 to about 25.2% by weight of (B) (3) based upon the total weight of (B) (1), (B) (2), and (B) (3) in the monomer mixture;

C. grinding the resulting composition of the methantheline bromide and inner matrix into a powder;

D. admixing said powder and a polymerizable monomer mixture containing:

1. polymerizable monoester of a member selected from the group consisting of acrylic acid, methacrylic acid, and mixtures thereof; and a polyhydric alcohol;

2. monethylenically unsaturated ester selected from the group consisting of alkyl acrylates, alkyl methacrylates, vinyl esters of saturated monocarboxylic acids of up to 22 carbon atoms, and mixtures thereof, wherein the alkyl group of said methacrylates or acrylates contains from 1 to 22 carbon atoms; and 3. polymerizable diester of a member selected from the group consisting of acrylic acid, methacrylic acid, and mixtures thereof; and a polyhydric alcohol; and wherein the monomer mixture contains from about 24 to about 49.3% by weight of (D) (1); from about 34 to about 64.6% by weight of (D) (2); and from about 0.1 to about % by weight of (D) (3) based upon the total weight of (D) (1), (D) (2), and (D) (3) in said monomer mixture; and E. then polymerizing to provide an outer matrix of the water-insoluble but water-swellable hydrophilic polymer of the monomer mixture containing the polymerizable monoester and diester.

* * * * *